United States Patent [19]
Berlad et al.

[11] Patent Number: 5,434,414
[45] Date of Patent: * Jul. 18, 1995

[54] REDUCTION OF IMAGE ARTIFACTS CAUSED BY UNWANTED PHOTONS

[75] Inventors: Gideon Berlad; Dov Maor; Yigal Shrem; Adrian Soil, all of Haifa, Israel

[73] Assignee: Elscint Ltd., Haifa, Israel

[*] Notice: The portion of the term of this patent subsequent to Mar. 8, 2011 has been disclaimed.

[21] Appl. No.: 889,406

[22] Filed: May 28, 1992

[30] Foreign Application Priority Data

Jun. 9, 1991 [IL] Israel ................................. 098420

[51] Int. Cl.$^6$ ................................. G01T 1/163
[52] U.S. Cl. ....................... 350/363.07; 250/363.02; 364/413.24
[58] Field of Search ............ 250/363.02, 363.04, 250/363.07; 378/7; 364/413.13, 413.24

[56] References Cited
U.S. PATENT DOCUMENTS

5,227,968  7/1993  Ichihara ................. 364/413.24
5,293,195  3/1994  Berlad et al. ............ 364/413.24
5,315,506  5/1994  Wang et al. ............. 364/413.19

Primary Examiner—Paul M. Dzierzynski
Assistant Examiner—David Vernon Bruce
Attorney, Agent, or Firm—Sandler, Greenblum & Bernstein

[57] ABSTRACT

A system for recording fewer of the events that are caused either by Compton scatter photons or by gamma radiation interacting with lead. The system locally determines the energy spectrum and fits the determined energy spectrum with a trial function composed of a photopeak component of known energy shape, but unknown magnitude and a Compton scatter component having a theoretically derived energy shape and an unknown magnitude for each pixel of the image. The trial function is locally fitted to the measured energy spectrum to obtain the values of both the Compton Coefficient and the gamma radiation interacting with lead. This enables removal of Compton contamination and also the contamination caused by interaction of the gamma photons with lead components.

40 Claims, 2 Drawing Sheets

REDUCTION OF IMAGE ARTIFACTS CAUSED BY UNWANTED PHOTONS

FIELD OF THE INVENTION

This invention is concerned with gamma camera imaging and, more particularly, with methods and systems for obtaining images having reduced artifacts due to multiple photopeak and unwanted events. An event is herein defined as a photon striking the gamma camera detector and causing a scintillation that is acquired as data for use in constructing an image. An unwanted event is therefore an event where the photon striking the gamma camera detector is either not coming from the object under examination or is not coming directly from the object under examination. An unwanted photon is a photon which causes an unwanted event. This is an improvement to the invention disclosed in application Ser. No. 700,420 filed May 15, 1991 now U.S. Pat. No. 5,293,195.

BACKGROUND OF THE INVENTION

In passing through the human body, gamma photons have a certain probability of scattering due to the Compton effect. Such scattering changes the direction and energy of the photons. When a photon that has been scattered is detected by the gamma camera, false position information is derived from the scattered photons. Thus, the scattered photons cause events that are unwanted for use in constructing the image. Other unwanted events exist. For example, the radiation emitted from the patient often excites lead (K) X-rays from the collimator and other lead parts. These X-rays also impinge on the detector and may be registered as events. These X-ray photons constitute an additional source of image blurring.

The problem of X-ray induced events arises especially for radio isotopes emitting photons in the energy range of 88–120 KEV. In this range, the lead X-ray excitation probability is high and the spectrum of these photons coincides with a relevant part of the isotopes spectrum, by partially overlapping the photopeak. Thus, the unwanted part of the spectrum in each pixel has two terms: one made up of the Compton scattered photons, and the other made up of the lead X-ray photons.

In principle the events caused by unwanted photons should be discarded. However, it is not easy to arrive at criteria that are efficient and effective for discarding such events. For example, an energy level criterion is not effective because although the photon loses part of its energy in the scattering process, the energy resolution of the typical gamma camera is such that there is a large amount of overlap between the energy of unscattered and scattered photons.

The invention of the previously mentioned patent application provided methods and means for qualitatively and quantitatively improving the recorded images by significantly reducing the contribution of Compton scattered photons to the final image to thereby providing a practically Compton-free image within seconds after acquisition. The invention accomplishes the task of reducing the number of events caused by Compton scattered photons by locally determining the energy spectrum and fitting the determined energy spectrum with a "trial" function composed of a photopeak component of known energy shape but unknown magnitude and a Compton scatter component having a theoretically derived energy shape and an unknown magnitude for each pixel of the image.

The true physical characteristics of the Compton process are used in the previously mentioned patent application to derive Compton multi-scatter functions which are subsequently used to construct the Compton scatter component energy spectra. Thus, the previous patent application uses the following inputs to determine the unknowns; (i.e., the magnitude of the photopeak component and the magnitude of the Compton multi-scatter components):

1. the measured energy spectrum per pixel. This includes counts due to scattered and unscattered photons, and
2. the measured system energy spread function for the isotope centerline which provide the photopeak energy shape.

The shape of the Compton component of the trial function is analytically derived in the prior application by converting the Nishina-Klein Equation that describes the physical relativistic scattering of photons with electrons into a probability distribution for a photon to scatter from a given energy to a lower energy in a single interaction with an electron. Repeated convolutions are used to obtain the probability distribution for the higher order scatter terms.

By locally fitting the trial function to the measured energy spectrum of acquired data, the values of the multi-scattered Compton co-efficients and the photopeak magnitude were obtained. This enables the removal of Compton contamination from the acquired data.

The prior invention, however, assumed a single photopeak. In certain isotopes there is more than one photopeak. If a single peak is assumed when more than one peak actually exists, the removal of scattered events from the image will be incomplete.

Accordingly, the invention of this application is an improvement over the invention of the prior mentioned applications in that, among other things, it takes into account radio isotopes having more than one peak and also takes into account all unwanted events due to Compton scattered photons and photons derived from such phenomena as X-rays caused by gamma radiation interacting with lead components.

BRIEF DESCRIPTION OF THE INVENTION

The present invention represents an improvement over the invention of the Israel Patent Application, Ser. No. 094691. The present invention reduces events caused by unwanted photons including, but not limited to, Compton scatter photons and also takes into account multiple photopeaks, such as are obtained when using certain radio isotopes. Thus, the image provided by utilization of the present invention improves over the image of the invention of the prior mentioned patent application.

In accordance with the present invention, there is provided a method of reducing the contribution of unwanted photons to an image produced by a gamma ray imaging system, said method including the steps of:

detecting photons impinging on a gamma ray detector as event counts, measuring the energy of said impinging photons and an X, Y location for each photon according to the location of the impingement of the photons on the detector, grouping each detected photon according to the measured energy and the X, Y location, accumulating counts of said photons at each X, Y location according to the determined energy level of the photons, constructing a measured energy spectrum at each X, Y location using the accumulated counts of the determined energy levels, said measured energy spectrum including counts of wanted and unwanted photons, calculating the energy distributions of unwanted photons, determining the energy spread function of the gamma ray imaging system being used, obtaining a system dependent energy distribution of the unwanted photons per location by using the energy distribution of the unwanted photons and the energy spread function of the system, constructing a trial function comprising the system dependent energy spread function multiplied by an unknown coefficient of wanted photons plus unknown coefficients of unwanted photons convolved with the system's energy spread function.

solving for the unknown coefficient of the wanted photons by locally fitting the measured energy distribution to the trial energy distribution of photons, and using the count of the wanted photons to produce an image practically free of unwanted photons.

According to a feature of the invention, the unwanted photons include Compton scattered photons originating from single or multiple radio isotope photopeaks.

According to another feature of the invention, the unwanted photons further include photons such as those due to lead X-rays.

BRIEF DESCRIPTION OF THE DRAWINGS

The above mentioned objects and features of the present invention along with additional objects and features will be best understood when considered in the light of the following description made in conjunction with the accompanying drawings; wherein.

GENERAL DESCRIPTION

Figure 1:
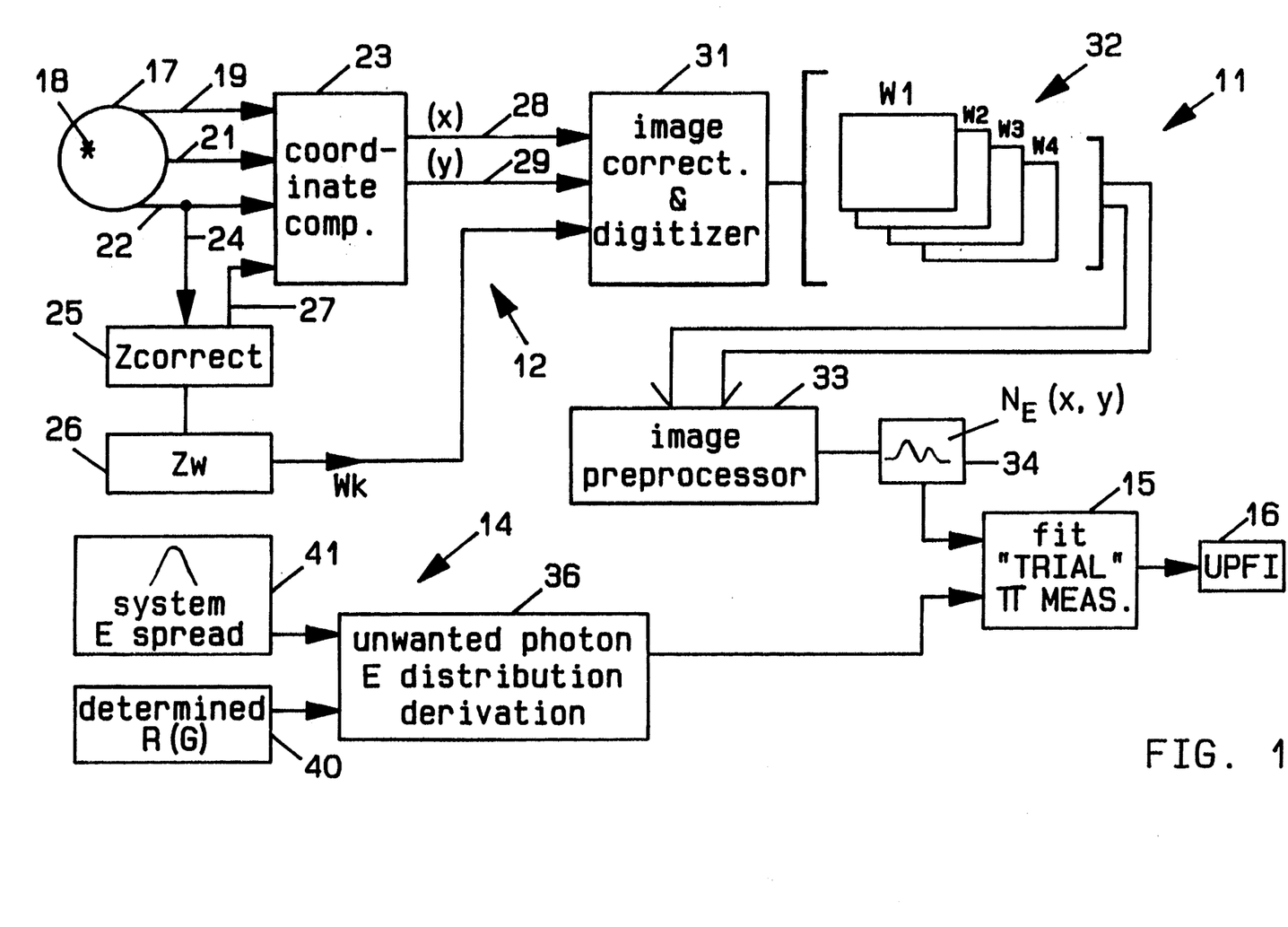
FIG. 1 is a block diagram showing of a gamma radiation imaging system for providing improved images by eliminating blurs caused in the past by multiple photopeak isotopes and the inclusion of unwanted events generated by Compton scattered photons and other unwanted photons.

FIG. 1 at 11 generally shows in block diagram form the inventive gamma camera system for producing improved images. FIG. 1 comprises a measured energy spectrum stage 12, a trial function preparation stage 14 and a curve fitting or computation stage 15 which provides an unwanted photon-free image (UPFI) 16.

The measured energy spectrum stage 12 comprises a gamma radiation detector 17. The gamma radiation detector 17 provides electrical signals responsive to events; i.e., photons impinging on the face thereof, such as indicated at 18. When an event occurs, electrical signals are provided on conductors 19, 21 and 22. These conductors 19, 21 and 22 are directed immediately to a coordinate computer 23 which determines X and Y location of the impingement of the photon 18 onto the detector 17. The X and Y coordinate location information is directed via conductors 28 and 29 respectively to the image corrector and digitizer 31.

Conductors 22 and 24 carry an electrical representation of the energy of the photon. The electrical representation of the energy is provided to an energy (Z) correction circuit 25. An energy processing circuit 26 divides the range of energy detected into a number of energy windows predetermined by the system operator.

When the energy is within certain limits, the energy correction circuit sends an enable signal over conductor 27 which enables the coordinate computer to determine the X and Y coordinate locations of the event. This information is directed to an image corrector and digitizer circuit 31 which corrects and digitizes the X, Y coordinates of the event. The information on the number of events is placed into a plurality of matrices 32 dependent on the photon's energy. Each of the matrices is a memory that retains the counts of events per X, Y location for a particular energy window such as, for example, a window that extends from 22 KEV to 25 KEV for window No. 1 and 25 KEV to 28 KEV for window No. 2, etc. The windows are shown as W1, W2, W3 extending to Wn where n is the predetermined number of energy windows.

The matrices are thus divided into X, Y locations that correspond to the co-ordinate location of the event on the detector. The X, Y locations also correspond to pixels in the final image. An imaging preprocessor 33 receives the data pixel-by-pixel from each of the windows and computes a measured or an acquired energy spectrum $N_E$ per pixel as shown in block 34. This acquired energy spectrum includes both the counts due to unwanted photons and wanted photons. The unwanted photons include Compton scatter photons and other or additional unwanted photons. Note that the energy spectrum may include more than one energy peak as shown in block 34.

The trial function stage 14 of FIG. 1 prepares a theoretical or a trial energy distribution $n(X,Y,\epsilon)$ including wanted and unwanted events herein:

$$n(X,Y,\epsilon) = Np(X,Y)P^{(k)}(\epsilon) + \sum_{m=1}^{M} Q_m(X,Y) \int d\epsilon' P(\epsilon',\epsilon) \pi_m^{(k)}(\epsilon') + K_o(X,Y)R(\epsilon) \quad (1)$$

where:

$\epsilon = E/mC^2$ the photon energy in units of electron rest energy, $mC^2$, $$P^{(k)}(\epsilon) = \sum_{i=1}^{(k)} W_i P(\epsilon_1,\epsilon);$$

it is the system energy spread function at $\epsilon_1, \epsilon_2, \ldots$; ($P^{(k)}(\epsilon)$ can also be measured in an environment free of all unwanted photons).

(k) is a superscript denoting the number of discrete energy lines in the source, m is a subscript indicating the number of the Compton scatter order, and M is a script indicating the chosen number of Compton scatter orders included in the computation.

$\pi_m^{(k)}(\epsilon')$ is the energy distribution of events caused by photons scattered m times from original energies $\epsilon_i$ with known relative intensities $W_i$ to intermediate energy $\epsilon'$ (i.e., the shape of the energy probability distribution of photons scattered m times), $$\pi_m^{(k)}(\epsilon') = \sum_{i=1}^{(k)} W_1 \pi_{m1}(\epsilon_1, \epsilon)$$

with $\pi_m$ for $m > 1$ being calculated recursively,
$W_i$ are the known relative intensities of $\epsilon_i$, $$\sum_{i=1}^{k} W_1 = 1.$$

$N_P(X,Y)$ is the spatial distribution (counts/pixel) of events caused by unscattered photons.

$Q_m(X,Y)$ is the spatial distribution (counts/pixel) of events caused by photons scattered m times, $\epsilon_i$ is the original energies of the photons emitted from a radioactive source, $\epsilon$ is the measured energy of the photon, $\epsilon'$ is an intermediate energy of a photon, $R(\epsilon)$ is the measured energy spectrum of additional unwanted photons such as by way of example photons from lead X-rays. (Note $R(\epsilon)$ can also be calculated using published tables and convolving with the system spread function).

$K_o(X,Y)$ is the spatial distribution (counts/pixel) of the events caused by the additonal unwanted radiation.

An important purpose of the invention is to determine the spatial distribution of the wanted events $N_P(X, Y)$.

To determine the count of events per pixel, block 15 fits the measured values that is the measured energy spectrum per pixel and the system energy spread function with unknowns; i.e., the magnitude of the photopeaks and the shape and magnitude of the unwanted photon spectrum to the values of the trial distribution $n(X,Y,\epsilon)$. The fit provides the wanted spatial distribution $N_P(X, Y)$. With the knowledge of the spatial distribution of the wanted photon, the scattered and other unwanted photon-free image is produced as indicated at 16.

Figure 2:
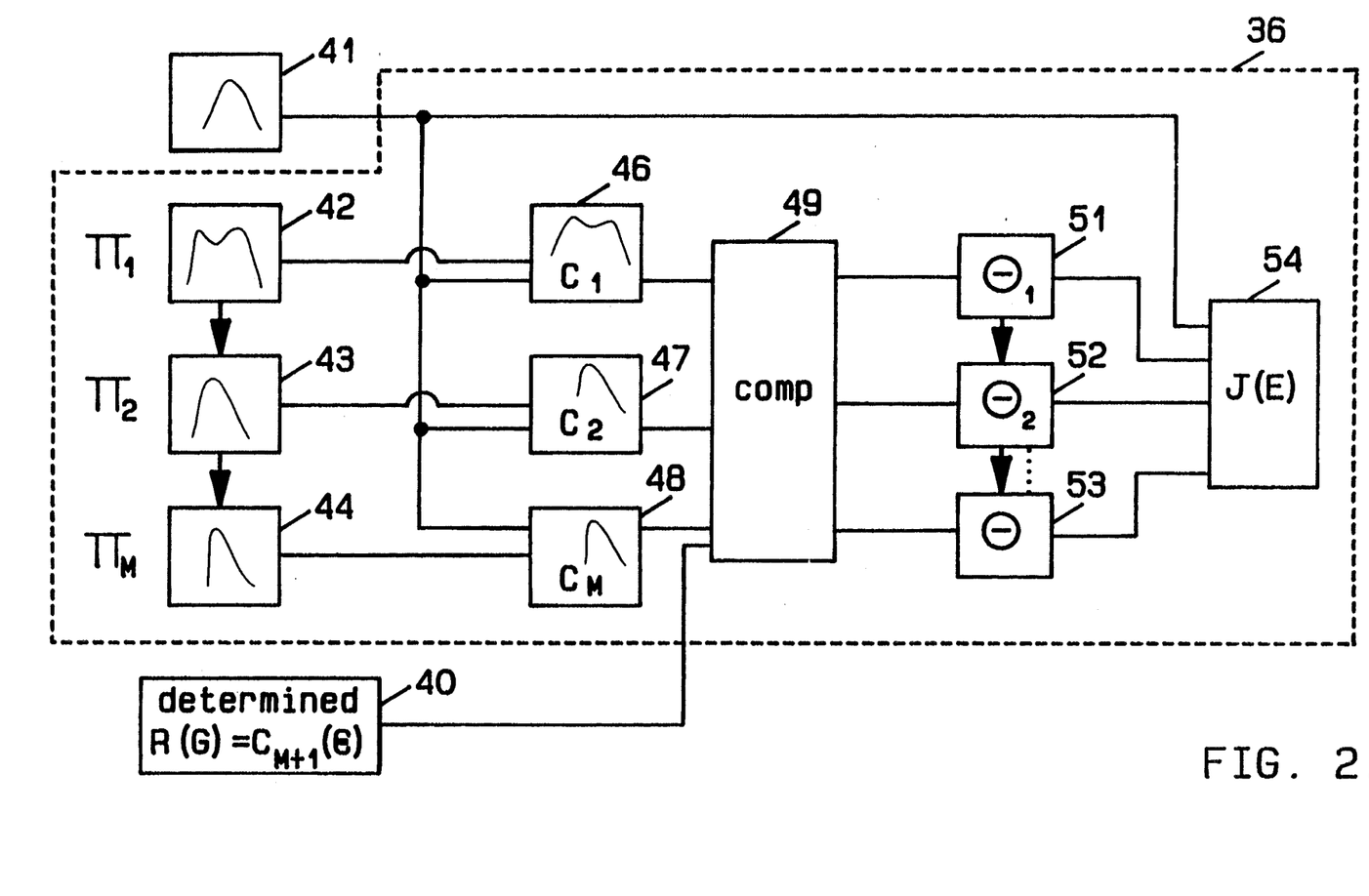
FIG. 2 represents details of the preparations, computations and operations used in the system shown in FIG. 1.

Details of the computations that occur at the trial function preparation section 14 of FIG. 1 are indicated in FIG. 2. More particularly, as shown in FIG. 2, values based on the system energy spread function shown in block 41 of FIG. 1 and FIG. 2, are entered into blocks 36 FIGS. 1 and 2. In addition, values based on additional unwanted (photons) radiation such as, for example, lead X-rays are determined (either by measurement or by computation) as shown in block 40 of FIGS. 1 and 2.

The energy spread function of the system is assumed to be known. It is measured once and is kept in the memory of the system. The measurement is easily accomplished by providing sources of gamma radiation of known energy and detecting the radiation with the equipment 11 of FIG. 1, for example. The detection is made without any Compton scatter media or X-ray providing lead between the energy source and the detector. This provides an energy spread function for a monoenergy source or a multi-energy force due to the detector energy resolution without unwanted photons as shown in block 41. The preparation block 36 computes $\pi_m$; i.e., the energy distribution of the unwanted photons including Compton photons, for example, and further including Compton photons for each scattering order. This is done by using the Nishina-Klein equation to derive the different orders of scattered unpolarised photons; i.e.:

$$\pi_1(\epsilon_i, \epsilon) = \begin{cases} \frac{1}{\epsilon_i^2}\left[\frac{\epsilon}{\epsilon_i} + \frac{\epsilon_i}{\epsilon} - \left(\frac{1}{\epsilon} - \frac{1}{\epsilon_i}\right)\left(2 - \frac{1}{\epsilon} + \frac{1}{\epsilon_i}\right)\right]; \\ \qquad \frac{\epsilon_i}{1 + 2\epsilon_i} \leq \epsilon \leq \epsilon_i \\ 0; \qquad \text{elsewhere} \end{cases} \quad (2)$$

elsewhere $\pi_1^{(k)}(\epsilon)$ is the weighted combination of the first order Compton energy distribution for each of the k photopeaks, or $$\pi_1^{(k)}(\epsilon) = \sum_{i=1}^{k} W_1 \pi_1(\epsilon_i, \epsilon) \qquad (2a)$$

The higher orders of scatters are derived recursively by repeated convolution using the equation:

$$\pi_m^{(k)}(\epsilon) = \begin{cases} \int_{\epsilon_m}^{\epsilon_o} d\epsilon_{m-1} \pi_{m-1}^{(k)}(\epsilon_{m-1}) * \pi_1(\epsilon_{m-1}, \epsilon_m); \\ \qquad \frac{\epsilon_o}{1 + 2m\epsilon_o} \leq \epsilon_m \leq \epsilon_o \\ 0; \qquad \text{elsewhere} \end{cases} \quad (3)$$

elsewhere

Where $\epsilon_o$ is the maximum of all $\epsilon_i$ ($i = 1, 2 \ldots k$).

Note that the equations are solved recursively in that each higher order equation requires knowledge of the lower prior orders.

The energy distribution of Compton scatter photons provide a curve independent of the system for each order of the scatter. However, this system independent curve is acted upon by the system energy spread function to provide the system dependent Compton multiscattered energy distributions denoted by $C_m^{(k)}(\epsilon)$. The shapes of the $C_m^{(k)}(\epsilon)$ distributions are obtained by convolving $\pi_m^{(k)}$ with the system energy spread function $P(\epsilon',\epsilon)$; i.e.:

$$C_m^{(k)}(\epsilon) = \int d\epsilon' \pi_m^{(k)}(\epsilon') P(a',\epsilon) \qquad (4)$$

This set of equations provides the shape of the Compton energy distributions for each order of scatter after being operated on by the system energy spread function.

FIG. 2 indicates the computations resulting in the $\pi_m^{(k)}$ values using the Nishina-Klein equation in blocks 42, 43 and 44 for $\pi_1^{(k)}$ and consequently $\pi_2^{(k)} \ldots$ m.

The shapes of $\pi_1^{(k)}$, $\pi_2^{(k)}$ and $\pi_m^{(k)}$ in blocks 42, 43 and 44 are shown as being convolved with the system energy spread function of block 41 in blocks 46, 47 and 48 respectively, thereby providing the shapes $C1^{(k)}$, $C2^{(k)}$, etc. The computations to determine $\pi_1^{(k)}$, $\pi_2^{(k)}$, etc., are indicated as being recursive by the arrows going from $\pi_1^{(k)}$ to $\pi_2^{k}$, etc.

Hereafter the superscript (k) denoting the number of discrete energy lines in the source is omitted from the Cs.

A method for drastically reducing the number of computations is useful in this system. The reduction in the number of computations is accomplished by orthonormalization of the set $C_m(\epsilon)$. The orthonormalization is provided by constructing an orthonormal function (vector) set $\Theta_m$ using the Graham-Schmidt procedure:

$$\Theta_1^{(k)} = C_1/\sqrt{<C_1^2>}$$

$$\Theta_2^{(k)} = (C_2 - <\Theta_1 \cdot C_2> \Theta_1)/\sqrt{<C_2^2> - <\Theta_1 \cdot C_2>^2}$$

$$\Theta_{M+1}^{(k)} = (C_{M+1} - \sum_{l=1}^{M} <\Theta_l \cdot C_{M+1}> \Theta_l /\sqrt{<C_{M+1}^2> - \sum_{l=1}^{M} <\Theta_l \cdot C_{M+1}>^2} \quad (5)$$

Where for convenience $C_{M+1}(\epsilon)$ is defined as being identical to $R(\epsilon)$.

Where sums (integrals) over energy are defined by:

$$\sum_E F(E) \equiv <F>.$$

Note that the array set $\{\Theta_m\}$ obeys:

$$<\Theta_i, \Theta_j> = \delta_{i,j} \begin{cases} 1, & i = j \\ 0, & i = j. \end{cases}$$

The orthonormalization is accomplished in computer 49 and the results; i.e., $\Theta_1, \Theta_2 \ldots \Theta_{m+1}$ are shown in blocks 51, 52 53, for example.

The Compton sum (EQ(4)) can be rewritten using the $\Theta_k$'s:

$$\begin{aligned}\Sigma Q_m C_m &= \Sigma Q_m \Sigma <C_m \Theta_k> \cdot \Theta_k \; (*) \\ &= \Sigma (\Sigma <C_m \Theta_k> Q_m) \cdot \Theta_k \\ &= \Sigma q_k \cdot \Theta_k \end{aligned} \quad (6)$$

where $$q_k = \Sigma <C_m \cdot \Theta_k> \cdot Q_m$$

and: $m = 1, 2 \ldots M+1$
$k = 1, 2 \ldots M+1$.

*[with an orthonormal base $\{\Theta_m\}$ any vector $v$ can be represented as a superposition of an array of $\Theta_m'$:

$$v = \Sigma <v \cdot \Theta_m> \Theta_m.] \quad (7)$$

The trial distribution now reads:

$$n(X,Y;E) = N_P(X,Y) P(E_o,E) + C(X,Y;E_o,E) \quad (8)$$

where:

$$C(X,Y;E_o,E) = \sum_k q_k(X,Y) \Theta_k(E_o,E) \quad (9)$$

Hereafter the known energy spread function, $P$ is normalized such that $<P> = 1$.

In a preferred implementation, a least squares fit is used. More particularly, with the trial function $n(X,Y;\epsilon)$ of equation (1) and the multi-window acquisition results $N_E(X,Y)$ from block 34, a solution is sought for the number of counts caused by unscattered photons $N_P(X,Y)$ that will minimize the sum of the squares of differences for each pixel $\delta(X,Y)$:

$$\delta(X,Y) = <[n(X,Y;E) - N_E(X,Y)]^2> \quad (10)$$

More particularly, in the block 15 the following "fit" operation is performed, i.e., $$\frac{\partial \delta}{N_P} = o, \text{ and} \quad (11)$$

$$\frac{\partial \delta}{q_k} = O, \text{ where } k = 1, 2, \ldots \quad (12)$$

It can be shown that the solution of these equations is:

$$N_P(X,Y) = <N_E(X,Y) J(E)> \quad (13)$$

$$q_k(X,Y) = <N_E(X,Y) G_k(E)> \quad (14)$$

where:

$$J(E) = \frac{P(E_o,E) - \sum_k <P \cdot \Theta_k> \cdot \Theta_k(E_o,E)}{<P^2> - \sum_k <P \cdot \Theta_k>^2} \quad (15)$$

$$G_k(E) = \Theta_k(E_o,E) - <P \cdot \Theta_k> \cdot J_{(E)} \quad (16)$$

Note that since $J(E)$ and $G_k(E)$ are data independent, they can be apriori derived as indicated in FIG. 2 by block 54 which shows computing $J(E)$ using $\Theta_1, \Theta_2 \ldots \Theta_k$ and P. The "per-pixel" operations entail only the evaluation of the scalar product $$N_P = <N_E J(E)>. \quad (17)$$

The fit, therefore, determines the per pixel Compton scatter free count $N_P$.

To compensate for low statistics per pixel per energy window, the relative constancy of scatter distributions over large spatial domains is put to advantage by use of a "quasi-local" solution. More particularly, an expanded or "large" pixel is preferably used. Thus, if the top pixel is $(X_o, Y_o)$ the spatial window W is defined as:

$$(X_o - W) \leq X \leq (X_o + W); (Y_o - W) \leq Y \leq (Y_o + W) \quad (18)$$

of area $s = (2W+1)^2$

When the Compton component of the entire window s, $C^s$ is computed, the "per-pixel" Compton activity, $C^1$ can be approximated by its average:

$$C^1 = C^s/s. \quad (19)$$

The measured activity in the spatial window s (symmetric around the coordinates (X,Y)) is denoted as $N_E(X,Y)$, and the (X,Y)-pixel activity is denoted as $N_E(X,Y)$. A single parameter fit is done to find the local photopeak count. It can be shown that this is given by:

$$N_P^1(X,Y) = <N_E^1(X,Y) A_E^1 + N_E^S(X,Y) \cdot A_E^S> \quad (20)$$

where:

$$A_E^1 = P(E)/<P^2> \quad (21)$$

$$A_E^S = [J(E) - A_E^1]/s \quad (22)$$

Solving for $N^1_P(X,Y)$ gives the count/pixel of the Compton free image.

An alternative fitting method is the Maximum Likelihood Method. Given the measured activities $\{N_E\}$ the joint Poisson probability with respect to the parameters of the trial function $n(E)$ are maximized; i.e., find $n(E)$ such that $$P = \pi_E \left( \frac{n(E)^{N_E}}{N_E!} - n(E) \right) = \text{maximum} \quad (23)$$

or, since $\underline{P}$ is positive:

$$\ln P = <N_E \ln n(E) - n(E) - \ln N_E!> = \text{maximum} \quad (24)$$

It can be shown that for the maximum likelihood solution:

$$<n(E)> = <N_E>$$

which enables eliminating $N_P$ from the $n(E)$ function.

(Hereafter $(X,Y)$ are implicit, e.g., $n(X,Y;E)=n(E)$. Thus from equations (8) and (9) it follows that:

$$n(E) = <N_E> P + \sum_k q_k(\Theta_k - <\Theta_k> \cdot P) \quad (25)$$

Calculating the derivatives of $\ln \underline{P}$ with respect to $q_k$ and setting the resulting equation to $\overline{0}$ as required by the maximum condition, the following equations are obtained:

$$<\frac{N_E}{n(E)} (\Theta_k - <\Theta_k> \cdot P)> = \phi; k = 1, 2, \ldots \quad (26)$$

This is a set of non-linear coupled equations and cannot be solved in closed form. Using the multi-gradient method, an iterative solution for the $q_k$s can be obtained. Denoting $\delta q_k$ as the difference between $q_k$ before and $q'_k$ after the iteration $$\delta q_k = q'_k - q_k. \quad (27)$$

The coupled set of equations is linearized and soluble $$\sum_j M_{ij} \delta q_j = U_i \quad (28)$$

$$M_{ij} = <\frac{N_E}{n^2(E)} (\Theta_i - <\Theta_i>P)(\Theta_j - <\Theta_j>P)> \quad (29)$$

$$U_i = <\frac{N_E}{n(E)} (\Theta_i - <\Theta_i>P)> \quad (30)$$

After proper convergence of the solution for the array $q_k$ has been attained, the Compton free activity $N_P$ can be obtained from:

$$N_P = <N_E> - \sum_K q_k <\Theta_k> \quad (31)$$

Yet another alternative fit is the partial Maximum Likelihood Solution. Suppose that the least square solution provides the approximate functional structure of the Compton component. However, it is desired to introduce the Poisson statistics by changing the ratio of the photopeak to Compton events fraction in order to optimize the joint distribution. The trial function, $n(E)$, then is $$n(E) = <N_E>[f_P P + (1 - f_P)C] \quad (32)$$

where:

$$f_P = \frac{N_P}{<N_E>} \text{ is the photopeak fraction} \quad (33)$$

and C is the least square Compton solution, normalized to 1; i.e.:

$$C = C/<C> \quad (34)$$

Now the Maximum Likelihood Equation is maximized with respect to a single parameter, the photopeak fraction, $f_P$. Once $f_P$ is calculated, the scatter-free event distribution $N_P$ can be found using the equation:

$$N_P = f_P <N_E> \quad (35)$$

The optimization equation resulting from the differentiation with respect to $f_P$ reads:

$$\frac{N_E(P - C)}{C + f_P(P - C)} >= 0 \quad (36)$$

It is soluble by an iterative Newton-Raphson method:

$$f'_P = f_P + \frac{<N_E \cdot \tau>}{<N_E \cdot \tau^2>} \quad (37)$$

where:

$$\tau = \frac{P - C}{C + f_P(P - C)} \quad (38)$$

Yet another related method of obtaining the value of $N_P$ involves the semi-local Maximum Likelihood Fit Solution. As for the quasi-local solution, this is implemented here as follows: First a solution is obtained for the square called S surrounding the pixel $X_o, Y_o$, i.e.:

$$S = (X_o - W) \leq X \leq (X_o - W) \leq Y \leq (Y_o + W) = (2W + 1)^2 \quad (39)$$

Once the Compton free component of the entire window has been obtained, either by the full or by the partial Maximum Likelihood method; i.e., $$\overset{S}{N_P(X,Y)}$$

is known the slow Compton spatial variance is used by assuming:

$$C^1 = C^S/s \quad (40)$$

to obtain the $(X,Y)$-pixel Compton free activity:

$$N'_P = \frac{N_P}{s} + <N'_E - \frac{N_E^s}{s}> \quad (41)$$

If it is desired to eliminate the events caused by additional unwanted photons then block 40 is used to include such additional unwanted photons originated events in the "trial" equation.

In operation, the inventive system locally analyzes the energy spectrum which may comprise multiple energies and fits it with a trial function comprising a combination of the unscattered photopeak function and a function, representing the Compton scattered spectrum, and a function representing other unwanted photons. The function representing the Compton scattered spectrum is derived using the Nishina-Klein formula. The Compton scatter spectrum shape, therefore, inherently reflects the true relativistic distributions of the Compton scatter, unlike the previously used arbitrary polynomials. The function representing other unwanted photons can either be measured or computed. If measured, the system spread function is automatically included in the result. If computed, the result must be convolved with the system spread function.

The Nishina-Klein formula is recursively used to generate the multi-scattered Compton distribution $\pi_m^{(k)}$. Then each $\pi_m^{(k)}$ is convolved with the system energy spread function to obtain $C_m^{(k)}$, the system dependent Compton scatter distributions. The convolved functions are averaged or integrated for discrete windows to obtain discrete arrays required for the calculations. The set of discrete functions $C_i^{(k)}$ is then preferably orthonormalized to reduce the number of computations necessary and to assure that the inventive system can provide practically Compton free images within seconds after acquisition. The coefficients of the orthonormalized functions are parameters that provide the scattered counts per pixel. The parameters are determined by fitting between the final trial function comprised of the photopeak component or components, the scatter component and on other unwanted photon components to the measured energy distribution which includes both the scattered, unscattered photons and other unwanted photons. Local (and quasi-local) fitting can be used to expedite obtaining the coefficients of the fit functions.

A unique approach of the invention is that the parameters to be determined are coefficients of the physical Compton scatter functions. The said functions have the correct high energy threshold behavior ensuring correct fit at every point.

The inventive method also preferably improves the statistics for the calculations for the Compton fit by a method that takes advantage of the smoothness of the Compton distribution (quasi-local method). That is, the data in a preferred embodiment is summed over $(2n+1)$ square pixels for the fit where n is an integer. The values are then attributed only to the central pixel of the square. Similar calculations are done for each pixel.

Preferably a least square fit is used to solve the unknown coefficients, i.e., the amount per pixel of the unscattered events (and if desired for the amount per pixel of the scattered events). However, several variations employing the maximum likelihood fit are also described and are within the scope of this invention.

While the invention has been described with regard to specific embodiments, it should be understood that the description is made by way of example only and not as a limitation of the scope of the invention which is defined by the accompanying claims.

What is claimed is:

1. A method of improving images from a gamma camera system by considering isotopes having k photopeaks and by reducing the contribution of unwanted photons on an produced by a gamma ray imaging system, said method including the steps of:

detecting photons impinging on a gamma ray detector in an X,Y coordinate location according to the location of the impingement on the detector, determining the energy of each detected photon, grouping each detected photon according to the determined energy in the X,Y coordinate location, accumulating counts of said grouped photons according to the determined energy level of the photons at each X,Y coordinate location, constructing an energy spectrum of each X,Y location using the accumulated counts, determining an energy distribution of unwanted photons, determining a system energy spread function of the gamma camera system for the known energy of wanted photons and for the determined energies of the unwanted photons, using the determined energy distribution of unwanted photons and the system energy spread function to obtain a system dependent energy distribution of the unwanted photons per X,Y coordinate location, constructing a trial function comprising the system energy spread function multiplied by an unknown coefficient of wanted photons plus the system dependent energy distribution of unwanted photons multiplied by unknown coefficients of unwanted photons, locally fitting the trial function to the constructed energy spectrum to obtain the count of the wanted photons by solving for the unknown coefficient of the wanted photons, and using the count of the wanted photons to produce an image practically free of unwanted photons.

2. The method of claim 1 wherein the step of locally fitting the trial function to the constructed energy spectrum is accomplished using a maximum likelihood fit.

3. The method of claim 1 wherein the step of locally fitting the trial function to the constructed energy spectrum is accomplished using a partial maximum likelihood fit.

4. The method of claim 1 wherein the step of locally fitting the trial function to the constructed energy spectrum is accomplished using least square fitting.

5. The method of claim 1 wherein the step of locally fitting the trial function to the constructed energy spectrum is accomplished using a combined least square and maximum likelihood fit.

6. The method of claim 5 wherein the step of measuring the energy function includes the steps of:

determining an X,Y location and energy of photons impinging on a system photon detector, using a plurality of matrices having X,Y pixels corresponding to impinging locations to accumulate counts of impinging photons, each of said matrices corresponding to one of a plurality of energy windows spanning an energy range, and constructing the measured energy spectrum from the accumulated counts in the matrices.

7. The method of improving images from gamma camera systems of claim 1 wherein said unwanted photons include Compton and other unwanted photons.

8. The method of claim 7 wherein $k=1$.

9. The method of claim 7 wherein k>1.

10. The method of improving images from gamma camera systems of claim 1 wherein unwanted photons include Compton scattered photons.

11. The method of claim 10 wherein said unwanted photons include Compton and lead X-ray photons.

12. The method of claim 10 wherein the step used to obtain the system dependent energy distribution of unwanted photons includes the step of calculating the energy distribution of unwanted photons for each value of k.

13. The method of claim 12 wherein the step of using the determined energy distribution of unwanted photons and the energy spread function of the system includes the step of measuring at least one energy distribution of unwanted photons with the system whereby the measured distribution inherently includes the energy spread function of the system.

14. The method of claim 12 wherein the step of using the determined energy distribution of unwanted photons and the energy spread function of the gamma ray imaging system includes convolving the energy distribution of unwanted photons with the energy spread function of the gamma ray imaging system.

15. The method of claim 14 wherein said step of constructing a trial function comprises:
summing the convolved system dependent energy distribution of the determined energy distribution of unwanted photons including the system energy distribution of Compton scattered photons and additional unwanted photons both with unknown X,Y coefficients, and
locally fitting the trial function to the constructed energy spectrum to solve for the unknown X,Y coefficients and thus for determining the counts of the unscattered photons.

16. The method of claim 15 wherein said step of determining the energy distribution of unwanted photons comprises the step of:
analytically determining the energy distribution of Compton scattered photons.

17. The method of claim 16 wherein the step of analytically determining the energy distribution of Compton scattered photons includes the steps of:
converting a Nishina-Klein equation to an m order photon scatter probability distribution to determine the energy distribution of the m order scattered photons where m=1,2 ... M, and
convolving the energy distribution of the m-order scatter photons with the energy spread function of the system to obtain probability distributions of m+1 order scatter photons.

18. The method of claim 17 including the step of obtaining a set of discrete functions from the energy distribution of the m-order Compton scatter photons by averaging the calculated Compton energy distributions for each grouping.

19. The method of claim 18, including the step of reducing the number of calculations.

20. The method of claim 19 wherein the step of reducing the number of calculations comprises converting discrete functions into an orthonormal set of functions.

21. The method of claim 20 wherein the fitting step includes:
using quasi-local pixels to obtain local counts of the scattered photons, and
doing a single parameter fit to determine the local counts at each of the k photopeaks.

22. The method of claim 21 wherein the step of using quasi-local pixels comprises:
using large pixels comprising a $(2n+1) \times (2m+1)$ rectangle of pixels where both n and m are positive integers and the value of the large pixel is divided by the number of pixels in the large pixel and attributed to the center pixel, and
evaluating all pixels in this method.

23. A method of producing practically unwanted photon free images of a patient with a gamma ray imaging system, said method comprising the steps of:
determining a trial function,
said step of determining a trial function comprising the steps of:
multiplying a known system energy spread function by an unknown count number due to unscattered photons,
convolving an energy distribution of m-order scatter photons derived from the probability of physical interaction of the photons in the known system and a system energy spread function to provide a system dependent set of Compton fit functions,
multiplying the system dependent Compton fit functions by unknown numbers corresponding to counts of scattered photons,
locally measuring an energy spectrum of the patient that includes total counts due to wanted photons from k energy lines in a radio isotope ingested by the patient, where k=1, and due to unwanted photons including scattered and additional unwanted photons,
locally fitting the trial function to the locally measured energy spectrum to determine the unknown count due to unscattered photons, and
using the count number due to the unscattered photons to produce the practically Compton free image.

24. A system for improving images from a gamma camera system by considering isotopes having k photopeaks and by reducing the contribution of unwanted photons on an image produced by a gamma ray imaging system, said system comprising:
a gamma camera detector for detecting gamma photons impinging thereon at an X,Y coordinate location,
means for determining the energy of each detected photon,
means for grouping each detected photon according to the determined energy in the X, Y coordinate location,
means for accumulating counts of said grouped photons according to the determined energy level of the photons at each X, Y coordinate location,
means for constructing an energy spectrum of each X, Y location using the accumulated counts,
means for determining an energy distribution of unwanted photons,
means for determining the energy spread function of the gamma camera system for the known energy of the wanted photons and for the determined energies of the unwanted photons,
means for using the determined energy distribution of unwanted photons and the energy spread function of the system to obtain a system dependent energy distribution of the unwanted photons per X,Y coordinate location,
means for constructing a trial function comprising the system energy spread function multiplied by an unknown coefficient of wanted photons plus the system dependent energy distribution of unwanted photons multiplied by unknown coefficients of unwanted photons, means for locally fitting the trial function to the constructed energy spectrum to obtain the count of the wanted photons by solving for the unknown coefficient of the wanted photons, and means for using the count of the wanted photons to produce an image practically free of unwanted photons.

25. The system of claim 24 wherein said unwanted photons include Compton and lead X-ray photons.

26. The system for improving images from gamma camera systems of claim 24 wherein said unwanted photons include Compton and other unwanted photons.

27. The system of claim 26 wherein k=1.

28. The system of claim 26 wherein k>1.

29. The system for improving images from gamma camera systems of claim 24 wherein unwanted photons include Compton scattered photons.

30. The system of claim 29 wherein the means to obtain the system dependent energy distribution of unwanted photons includes means for calculating the energy distribution of unwanted photons fop each value of k.

31. The system of claim 30 wherein the means for using the determined energy distribution of unwanted photons and the energy spread function of the gamma ray imaging system includes means for convolving the energy distribution of unwanted photons with the energy spread function of the gamma ray imaging system.

32. The system of claim 31 wherein the means for using the determined energy distribution of unwanted photons and the energy spread function of the system includes means for measuring at least one energy distribution of unwanted photons with the system whereby the measured distribution inherently includes the energy spread function of the system.

33. The system of claim 31 wherein said means for constructing a trial function comprises:

means for summing the convolved system dependent energy distribution of the determined energy distribution of unwanted photons including the system energy distribution of Compton scattered photons and additional unwanted photons both with unknown X,Y coefficients, and means for locally fitting the trial function to the constructed energy spectrum to solve for the unknown X,Y coefficients and thus for determining the counts of the unscattered photons.

34. The system of claim 33 wherein said means for determining the energy distribution of unwanted photons comprises:

means for analytically determining the energy distribution of Compton scattered photons.

35. The system of claim 34 wherein the means for analytically determining the energy distribution of Compton scattered photons includes:

means for converting a Nishina-Klein equation to an m order photon scatter probability distribution to determine the energy distribution of the m order scattered photons where m=1,2 ... M, and means for convolving the energy distribution of the m-order scatter photons with the energy spread function of the system to obtain probability distributions of m+1 order scatter photons.

36. The system of claim 35 including means for obtaining a set of discrete functions from the energy distribution of the m-order Compton scatter photons and means for averaging the calculated Compton energy distributions for each grouping.

37. The system of claim 36, including means for reducing the number of calculations.

38. The system of claim 37 wherein the means for reducing the number of calculations comprises means for converting discrete functions into an orthonormal set of functions.

39. The system of claim 37 wherein the means for fitting includes:

quasi-local pixel means for obtaining local counts of scattered photons, and means for doing a single parameter fit to determine the local counts at each of the k photopeaks.

40. The system of claim 39 wherein the quasi-local pixel means comprises:

large pixels comprising a $(2n+1) \times (2m+1)$ rectangle of pixels where both n and m are positive integers and the value of the large pixel is divided by the number of pixels in the large pixel and attributed to the center pixel, and means for evaluating all pixels in this method.

* * * * *